Patented Feb. 26, 1929.

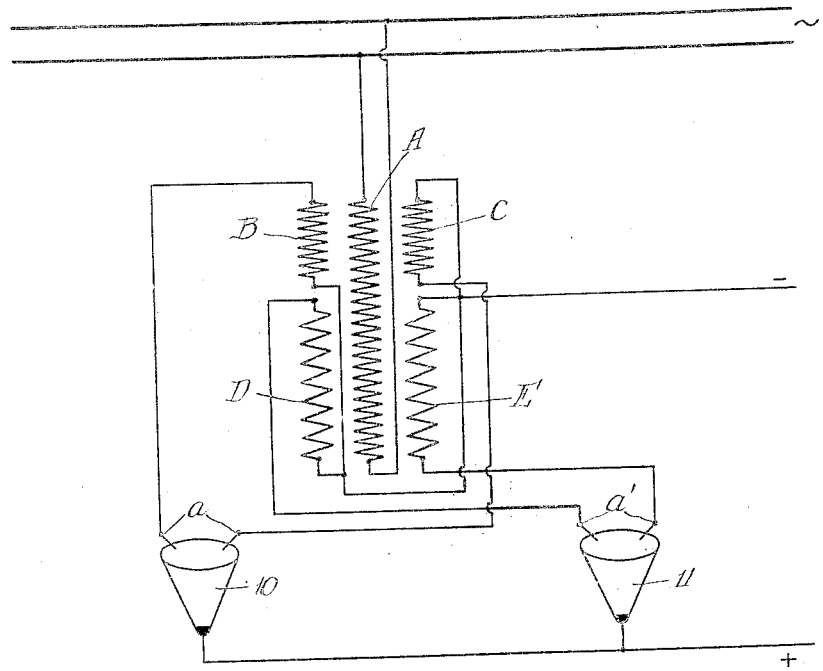
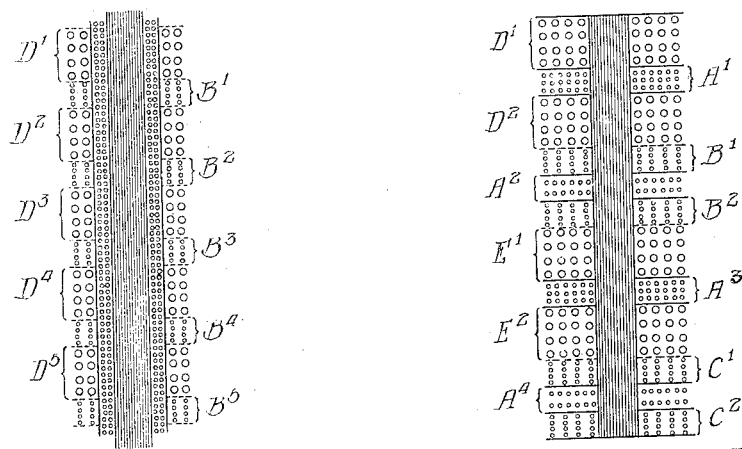

1,703,110

UNITED STATES PATENT OFFICE.

JULIUS JONAS, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND.

ELECTRICAL RECTIFYING SYSTEM.

Application filed January 26, 1927, Serial No. 163,611, and in Germany January 28, 1926.

This invention relates to apparatus for the rectification of alternating electrical currents to direct current and has particular applicability in systems in which rectifiers of the mercury vapor type are employed.

The general object of the invention is the provision of an effective means for obtaining a distribution of the impressed load, in a desired constant ratio, between rectifiers operating in parallel and fed from separate secondary windings of a single transformer.

Another object is the improvement of the power factor in apparatus of this type.

Other and further objects will be pointed out or indicated hereinafter or will be apparent to one skilled in the art upon an understanding of the invention or its employment in practice.

In the accompanying drawing forming a part of this specification, I illustrate in diagrammatic fashion certain structural arrangements in which the invention may be embodied or availed of, but it is to be understood that these are presented for purpose of illustration and example only, and are not to be accorded any interpretation having the effect of limiting the appended claims short of the true and most comprehensive scope of the invention in the art.

In said drawing,

Fig. 1 is a diagram of rectifying apparatus comprising two mercury vapor rectifiers arranged for operation in parallel and fed from a single phase transformer;

Fig. 2 is a diagram representative of a longitudinal section through the core and windings of a transformer having two secondary windings arranged in a distributed relationship such as to obtain a definite distribution of the load between them; and Fig. 3 is a similar diagram of a transformer portion having four secondary windings.

When a plurality of rectifiers are supplied from a single transformer, care must be taken in the arrangement of the windings of the latter to insure proper distribution of the load among the several rectifiers during parallel operation. The result may be accomplished by providing on the transformer a separate secondary for each rectifier and arranging the sections of said secondary windings which carry currents of the same phase simultaneously, side by side on the appropriate core of a transformer, opposite the primary winding. If the secondary windings are arranged without subdivision on the primary winding, the primary ampere-turns will be fully compensated only at times when the distribution of the load between the rectifiers is in normal proportion. By the present invention, I provide an arrangement whereby, in the event of a change of the load conditions as between the rectifiers, the manner in which the transformer windings are inductively coupled will give rise to E. M. F.'s opposing a change in the load distribution between the rectifiers. The arrangement of the secondary windings is suitable not only for distribution of the load among different rectifiers, but also for cases where parallel operating anodes are to be supplied whether belonging to different or the same rectifiers. This arrangement of the windings is characterized in the first place by a side by side arrangement of the different secondary windings in subdivisions which are distributed over the primary winding. Fig. 1 shows, by way of example, a transformer having a primary winding A and four secondary windings B, C, D and E for supplying the rectifiers 10 and 11. The anodes $a$ of rectifier 10 are supplied by the secondary windings B and C, while the anodes $a'$ of rectifier 11 are supplied by secondary windings D and E. Disregarding the magnetizing current, and starting on the assumption that the current in the primary induces, at every point on the wound core, a current in the secondary of such magnitude that the ampere-turns per unit of core length balance, it follows that the secondary current tends to maintain a value corresponding to the ratio of ampere-turns per unit of core length. Hence, by providing all the adjacent secondaries with the same number of turns, which is essential for parallel operation since they must have the same voltage, with a given load current in the primary, the current in each secondary winding becomes a function of its turns per unit of core length, the lower values of the latter corresponding to larger currents. Thus, to obtain any desired distribution of load among the parallel rectifiers or anodes, in accordance with the present invention, the secondary windings, in addition to being arranged side by side, must be so proportioned that the ratio of their turns per unit of core length is the reciprocal of the load ratio desired. By way of illustration, if the secondary winding D contains the same number of turns as the secondary winding B, but is distributed over a core length twice that embraced by winding B, the voltage of the two windings will be the same, but the current in D will be twice that in B. The proper compensation of the primary winding is attained by the proper proportioning of the secondary windings and their distribution over the primary winding in appropriate subdivisions arranged side by side in proper linkage association with the primary winding. An example of such arrangement is illustrated in Fig. 2 wherein the secondary winding D is arranged in the subdivisions $D^1$, $D^2$, $D^3$, $D^4$ and $D^5$ which embrace, in the aggregate, twice the core length embraced by the aggregate subdivisions $B^1$, $B^2$, $B^3$, $B^4$ and $B^5$ of the winding B. Thus, in the arrangement here illustrated, the winding D will take twice the load of the winding B. Fig. 3 illustrates an arrangement of the secondary windings B, C, D and E in a sandwich relationship with the primary winding A. Here the primary winding is arranged in the sections $A^1$, $A^2$, $A^3$ and $A^4$, the secondary winding B in the sections $B^1$ and $B^2$, the secondary winding D in the sections $D^1$ and $D^2$, the secondary winding C in the sections $C^1$ and $C^2$ and the secondary winding E in the sections $E^1$ and $E^2$. With each of the windings D and E embracing twice the core length embraced by each of the windings B and C, it follows that each of the windings D and E will carry a load twice that carried by each of windings B and C. With the similar secondaries connected to the same rectifier, therefore, as illustrated in Fig. 1, the rectifier fed by windings D and E will take a load twice that taken by the rectifier supplied by windings B and C, while the voltage impressed on the rectifiers will be the same. To contribute to equalization of the voltage drops in the different secondary windings, their subdivisions are arranged alternately in such a way that sections belonging to the different secondaries succeed each other in turn along the core.

What I claim is:

1. In electric current rectifying apparatus, the combination with a plurality of rectifier terminals for operation in parallel, of a transformer for feeding said terminals, said transformer having a plurality of secondary windings each containing the same number of turns and arranged in like coupling relationship to the core, respective secondary windings embracing different lengths of core which are in proportion to the desired load distribution between the secondary windings, the secondary windings of different core length being connected to different rectifier terminals.

2. In electric current rectifying apparatus, the combination with rectifiers arranged for operation in parallel, of a transformer for distributing the load between the rectifiers, said transformer having different secondary windings of equal voltage connected to different rectifiers, said secondary windings arranged side by side on the transformer core and having the ratio of their turns per unit of core length, one to another, equal to the reciprocal of the ratio of the desired load distribution between the rectifiers.

3. A load distributing device for rectifiers operating in parallel, comprising a transformer having different secondary windings connected to different rectifiers, said secondary windings having like voltage determining characteristics and having the ratio of their turns per unit of core length inversely proportional to the ratio of desired load distribution between the rectifiers.

4. A load distributing device for rectifiers operating in parallel, comprising a transformer having different secondary windings connected to different rectifiers, the secondary windings being distributed along the core in subdivisions with the subdivisions of the different windings arranged side by side in successive order along the core, the ratio of turns of the different windings per unit of core length being inversely proportional to the desired ratio of load distribution between the rectifiers.

5. A load distributing device for rectifiers operating in parallel, comprising a transformer having its primary winding distributed along the core and different secondary windings for connection to different rectifiers, said secondary windings being arranged in subdivisions with the subdivisions of different windings disposed side by side in successive order along the core, the ratio of turns of the different secondary windings per unit of core length being inversely proportional to the desired ratio of load distribution between the different rectifiers.

6. The combination with a plurality of rectifier anodes arranged for parallel operation, of a transformer having different secondary windings connected to different anodes, said secondary windings arranged in subdivisions side by side alternately along the core, and the ratio of the turns of the different windings per unit of core length being inversely proportional to the ratio of the desired load distribution between the different anodes.

7. In a current-rectifying system, rectifying apparatus having parallel-connected anodes subject to different load conditions; and a single supply transformer for said apparatus comprising a first and a second set of secondary windings connected respectively to said anodes, a core common to said windings, and primary winding means disposed about said core in fixed and permanent relation with respect thereto, the number of turns of the secondary windings comprising the first set being substantially equal to the number of turns of the secondary windings comprising the second set, the distribution with respect to said core of the secondary windings comprising the first set being unequal to such distribution of the secondary windings comprising the second set in amount inversely proportional to the load conditions of the respective anodes connected to said sets of windings.

In testimony whereof I have hereunto subscribed my name this 5th day of January A. D. 1927 at Zurich, Switzerland.

JULIUS JONAS.